(12) United States Patent
Lorange et al.

(10) Patent No.: US 7,850,403 B2
(45) Date of Patent: Dec. 14, 2010

(54) FINISHING MACHINES USED TO ORIENT OBJECTS

(75) Inventors: Stéphane Lorange, Octeville-sur-Mer (FR); Samuel Mathis, Octeville-sur-Mer (FR); Emmanuel Roth, Octeville-sur-Mer (FR); Gilles Waeldin, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 768 days.

(21) Appl. No.: 11/666,233

(22) PCT Filed: Oct. 21, 2005

(86) PCT No.: PCT/FR2005/002614
§ 371 (c)(1),
(2), (4) Date: Aug. 2, 2007

(87) PCT Pub. No.: WO2006/045927
PCT Pub. Date: May 4, 2006

(65) Prior Publication Data
US 2008/0314716 A1      Dec. 25, 2008

(30) Foreign Application Priority Data
Oct. 25, 2004   (FR) .................................. 04 11333

(51) Int. Cl.
*B65G 53/44*   (2006.01)
(52) U.S. Cl. ................. 406/79; 406/88; 198/397.03; 198/453; 198/457.01
(58) Field of Classification Search ............ 198/397.06, 198/397.03, 453, 457.01; 406/78–81, 88, 406/144
See application file for complete search history.

(56) References Cited
U.S. PATENT DOCUMENTS

| 2,954,862 | A | * | 10/1960 | Clark | ................... | 198/443 |
| 3,210,130 | A |   | 10/1965 | Kelly |   |   |
| 3,924,732 | A | * | 12/1975 | Leonard | ............... | 198/404 |
| 4,006,812 | A | * | 2/1977 | Everett et al. | ......... | 198/347.1 |

(Continued)

FOREIGN PATENT DOCUMENTS

JP         63 252822  A     10/1988

*Primary Examiner*—Joe Dillon, Jr.
(74) *Attorney, Agent, or Firm*—Sughrue Mion, PLLC

(57) ABSTRACT

An improvement to finishing machines that are used to orient objects. The finishing machine includes a hopper for receiving loose objects, such as lids, and an endless belt for extracting the lids from the hopper. The belt moves vertically upwards with the lids and sorts the lids automatically, such that only correctly-oriented lids are retained. The machine is also equipped with a combined system for ejecting and conveying oriented lids, including: a plate which covers the upper part of the belt and which extends laterally beyond the belt, downstream thereof, in order to support the lids as they are ejected from the grooves in the belt; devices for ejecting the lids from the grooves and for subsequently conveying same beyond the grooves downstream, the ejection devices including jets of propellant fluid which pass through the plate by an arrangement of eyes; and a casing which is disposed on the plate and into which the propellant fluid is introduced and maintained under pressure by a turbine, the casing extending over the entire surface of the plate. In addition, the downstream part of the casing includes a routing conveyor with an adjustable height, which transports the oriented lids toward the use stations.

11 Claims, 2 Drawing Sheets

U.S. PATENT DOCUMENTS

| | | | | |
|---|---|---|---|---|
| 4,104,966 A | * | 8/1978 | Ackley et al. | 101/40 |
| 4,735,343 A | | 4/1988 | Herzog et al. | |
| 4,741,428 A | * | 5/1988 | Taniguchi et al. | 198/397.04 |
| 5,394,972 A | | 3/1995 | Aidlin et al. | |
| 5,439,093 A | * | 8/1995 | Drewitz | 198/399 |
| 5,586,637 A | * | 12/1996 | Aidlin et al. | 198/397.06 |
| 6,533,504 B1 | | 3/2003 | Tye | |
| 7,040,489 B2 | * | 5/2006 | Zemlin et al. | 209/691 |
| 7,223,060 B2 | * | 5/2007 | Weidenmuller | 414/676 |

* cited by examiner

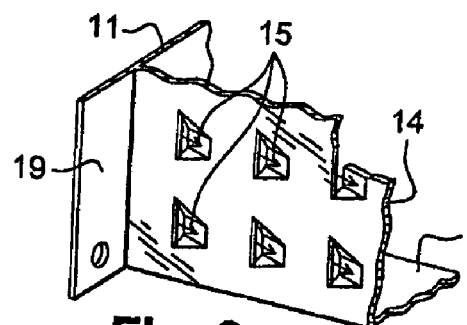
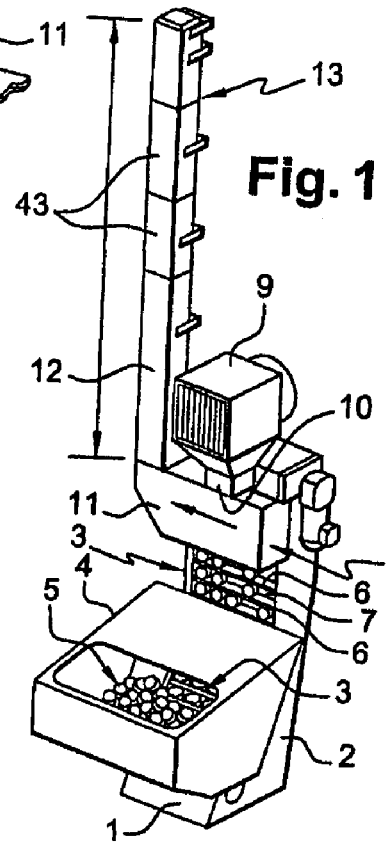
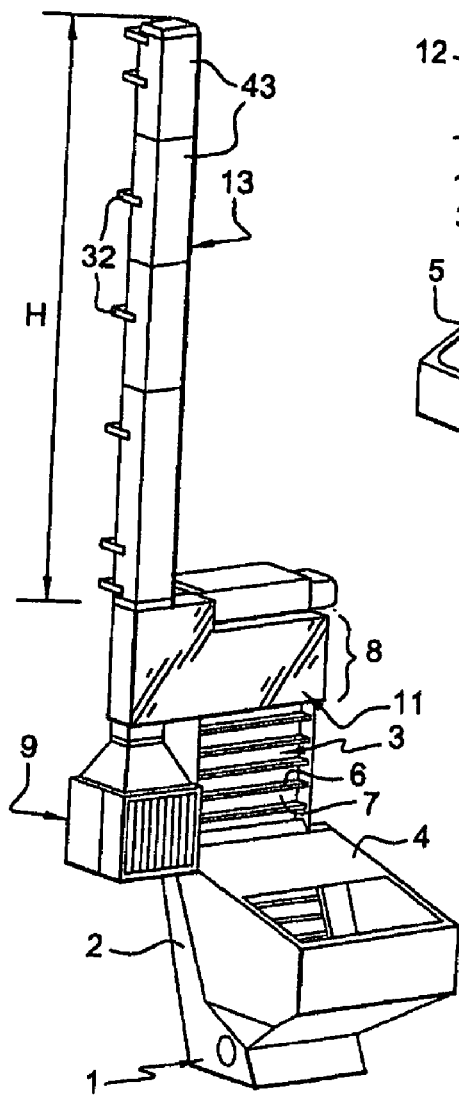
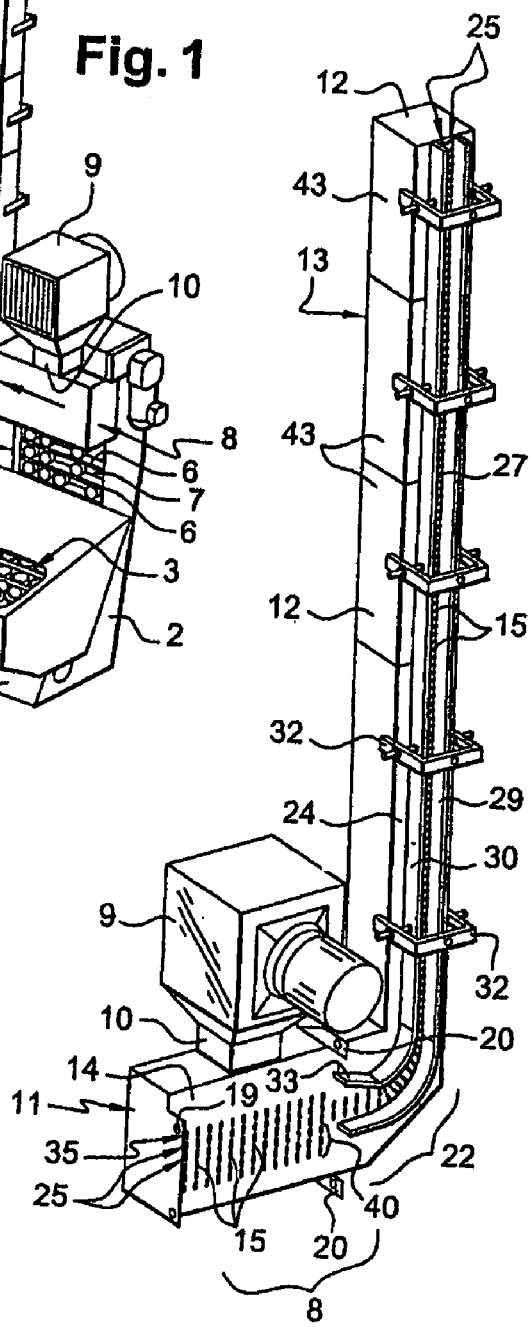
Fig. 3
Fig. 1
Fig. 8
Fig. 2

FINISHING MACHINES USED TO ORIENT OBJECTS

This application is a national-stage entry of PCT/FR2005/002614, filed Oct. 21, 2005. The application claims priority from French Application 0411333, filed on Oct. 25, 2004 in the French Intellectual Property Office, the disclosure of which is incorporated herein by reference.

The present invention relates to an improvement to finishing machines for orienting objects such as, for example, caps, said caps being delivered to a product preparation line like a bottling line.

These finishing machines, commonly called "cap feeders", receive the loose caps and, by appropriate means, automatically handle said caps to orient them all in the same manner, and these oriented caps are then conveyed to the bottling station by appropriate means of the conveyor or other type.

The invention relates to a finishing machine which orients the caps by means of an endless belt of the type with laths, said belt picking up said caps by means of its laths, from a hopper which is generally located at ground level.

The caps are taken up by the laths and extracted from the hopper by the movement of the belt, settling into grooves which are bounded by said belt and said laths. The belt rises virtually vertically and is arranged and guided so as to automatically eject the caps which do not have the proper orientation, said poorly oriented caps simply falling into the hopper. The caps retained by the laths, that is, those which are properly oriented, are then extracted from the grooves of the belt and are conveyed to the use site, such as, for example, a bottling station such as a capping machine, by appropriate means which provide the link between the site of the finishing machine and said bottling station.

The site of the cap finishing machine is mainly selected according to requirements associated with said machine. In fact, said finishing machine needs to be fed regularly with caps, owing to the large quantity of oriented caps consumed by the capping machine. It must be approachable to an operator and/or by appropriate means for permitting the loading of its hopper with loose caps. Nor should its situation on the site be a source of difficulties or complications for performing basic maintenance or other operations.

Furthermore, these finishing machines are used and designed to themselves perform part of the conveying of the oriented caps. This conveying is in fact achieved by means of their belt which can rise to a variable height; thanks to this variation in height, the caps are then conveyed by simple gravity, from the finishing machine to the capping machine. This height is adapted to the site, to the location of the finishing machine, and also to the location of the capping machine.

This particular arrangement of each finishing machine makes the production cost of these machines relatively high due particularly to the cost of their belt; this cost increases directly with the height of its oriented cap unloading level, said level corresponding to that of the ejection zone of said oriented caps, from the grooves of said belt.

The present invention proposes an improvement to this type of finishing machine, designed to reduce its cost and simplify, on the one hand, the finishing machine itself and, on the other, the installation of the conveyor system and particularly its connection and assembly with said finishing machine.

The present invention also provides definite improvements concerning the installation of these machines and the level of maintenance. In fact, the invention serves to reduce, or even eliminate, the installation constraints of these machines on site, thanks to new possibilities of connection with the receiving station where the oriented caps are used.

The present invention proposes as a product, a finishing machine which performs all the essential functions for supplying objects of the oriented cap type to a product preparation line such as, for example, a complete bottling line, and it also relates to the module which, associated with said finishing machine, enables said machine to have said essential functions.

The finishing machine of the invention comprises a hopper for receiving loose caps, and an endless belt, of the type with laths for extracting said caps from said hopper, and these caps are lodged in grooves bounded by said laths and said belt, said belt moving vertically with said caps and automatically sorting said caps to retain only those with the proper orientation, said machine further comprising a combined system for ejecting and conveying said oriented caps, said combined system comprising:

a plate which covers several adjacent grooves of said belt in which said oriented caps are located, said plate forming a sort of screen on said belt to close said grooves and extending laterally, downstream beyond said belt, to take charge, with suitable complementary means, of said oriented caps as they are ejected from said grooves;

means for ejecting said oriented caps from their grooves and for subsequently conveying them downstream beyond said grooves, said ejection means comprising jets of propellant fluid which pass through said plate through eye shaped arrangements, said jets being oriented downstream, on said caps;

a casing constructed on said plate and into which said propellant fluid is introduced and maintained under pressure by suitable means to serve as a driving agent to eject and entrain said oriented caps, said casing extending over the entire surface of said plate and comprising, in its downstream part, means for accommodating and attaching a routing conveyor which prolongs said casing and routes said oriented caps, with some continuity, toward the use station(s).

Also according to the invention, the means which prolong the grooves and which take charge of the oriented caps, comprise an intermediate conveyor, said intermediate conveyor comprising a continuous channel divided into several parts: —a first part acting as an inlet, arranged in a V shape, located facing the downstream end of said grooves of said belt at the ejection zone of said caps, and subsequently, a second part forming a leader for the routing conveyor, said routing conveyor prolonging said intermediate conveyor and, likewise with a propellant fluid, transporting said oriented caps, to the use station(s).

According to another arrangement of the invention and in particular in the case of a machine for preparing oriented caps at high production rates, the plate which acts simultaneously as an ejection screen and intermediate conveyor comprises several lines of eyes and particularly:

at least one main ejection and conveying line extending over the entire length of said plate; and at least one complementary ejection line located above and/or below said main ejection line(s), and extending over the entire width of the belt.

According to the invention, this plate which acts as a screen and intermediate conveyor, also comprises, in addition to the main ejection lines:

at least one complementary ejection line located above said main ejection line(s), and extending over the entire width of the belt; and at least one complementary pre-thrust line located under the main ejection line(s) and also extending over the entire width of said belt to gather the caps and force them against a stop located on the downstream side of said belt, under the inlet of the supporting V which receives said oriented caps after their ejection from the grooves of said belt.

Also according to the invention, the machine comprises one or more main ejection lines which, in their downstream part, at the intermediate conveyor, form a path of which the curve is adapted to the orientation of the routing conveyor, said path possibly extending on either side of the horizontal, upward or downward, up to a vertical position.

In the case in which the routing conveyor of the oriented caps makes a right angle with the casing to which it is fitted and extending upward, it constitutes a true functional element of the finishing machine, and it is formed of an assembly of several lengths making it possible to change its height easily to adapt it to the requirements of the site and the place to which said oriented caps must be delivered.

This arrangement serves to have, on the one hand, a standard finishing machine having a belt of optimized and constant length regardless of its final use and, on the other, an ejection and conveyor module whereof the height is adjustable according to the needs and specific requirements of the site where the oriented cap use station is located.

Also according to the invention, the conveyor system of the oriented caps comprises, for each conveyor, a continuous channel which covers the main line(s) of eyes, said channel comprising two lateral guide rails, parallel to one another, placed on either side of said lines of eyes, and a guide rail extending opposite said main lines of eyes, between said lateral guide rails, said guide rails optionally comprising means for adjusting their position to adapt the size of said channel to that of said oriented caps to convey.

According to another arrangement of the invention, the pressurized propellant fluid is fed to the ejection and conveyor casing and to the chamber of the routing conveyor, using means of the turbine type, of which the capacity is adapted to the characteristics of the circuit, that is, the quantity of eyes to be supplied and the pressure to be maintained in said casing and said chamber, said pressure being about 1500 Pa.

Also according to the invention, the turbine can be placed directly on the ejection casing, within the dimensions of the machine and particularly within the dimensions of the finishing belt, but it can also be placed on the side of the machine, laterally, under the ejection and conveyor casing.

The invention also relates to the cap finishing machine for feeding at least one bottling line, comprising a system for ejecting and conveying oriented caps as described in detail above; said machine comprising: —a belt whereof the size is adapted to the sole cap sorting and orientation function, becoming a standard dimension, and—an ejection and conveyor module for said oriented caps of which the height of the part constituting the routing conveyor is adjustable to freely adjust the level at which said oriented caps must be delivered for their use at the bottling station.

The invention is described in greater detail with the following description and drawings appended hereto, provided for information, and in which:

FIG. 1 shows a finishing machine of the invention, equipped with an oriented cap ejection and conveyor system;

FIG. 2 at a larger scale than FIG. 1, shows the oriented cap ejection and conveyor module, separated from the finishing machine and viewed from the side of the eyes and the conveyor channel;

FIG. 3, from another angle and at a larger scale, shows the detail of the bottom left corner of FIG. 2;

FIG. 4, at a larger scale than FIG. 2, shows the intermediate part of the ejection and conveyor module which is located between the pure ejection part and the conveyor part;

FIG. 8 shows an alternative presentation of the ejection and conveyor module associated with the finishing machine of the invention.

Figure 4:
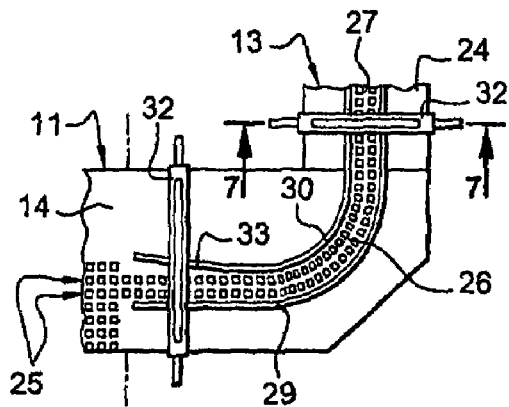

The finishing machine shown in FIG. 1 comprises a base (1) which supports, on the one hand, a vertical structure (2) serving as a guide for an endless belt (3) and, on the other, a hopper (4) in which the loose caps (5) are deposited. These caps (5) are taken automatically from the hopper (4) by means of the belt (3) of the type with laths (6) and they are housed in the grooves (7) of said belt (3), between said laths (6).

The belt (3) is guided vertically in the structure (2) to raise the caps (5) between the hopper (4) and the zone where they are ejected, in the upper part of the machine. This ejection zone is indicated by a horizontal arrow, in FIG. 1, and by the reference mark of the ejection zone (8).

Between the hopper (4) and the ejection zone (8), the caps (5) are subjected to a sorting operation to remove and recycle the poorly oriented caps. The properly oriented caps (5) appear above the hopper (4), between said hopper (4) and the zone (8) where they are ejected from the belt (3) and particularly from the grooves (7).

The oriented cap (5) ejection system comprises a set of means for applying continuous pressure to each of said caps. This pressure is applied by a propellant fluid, pulsed air which is channeled and oriented to make the caps advance laterally as described in detail below.

The pulsed air flow necessary for ejecting the oriented caps is produced by a turbine (9); the outlet (10) of this turbine (9) is positioned on a casing (11) located in the upper part of the finishing machine; the pulsed air is first introduced into said casing (11) and then into the chamber (12) of the routing conveyor (13) which prolongs the casing (11). The air pressure in the casing (11) and in the chamber (12) is about 1500 Pa.

Figure 6:
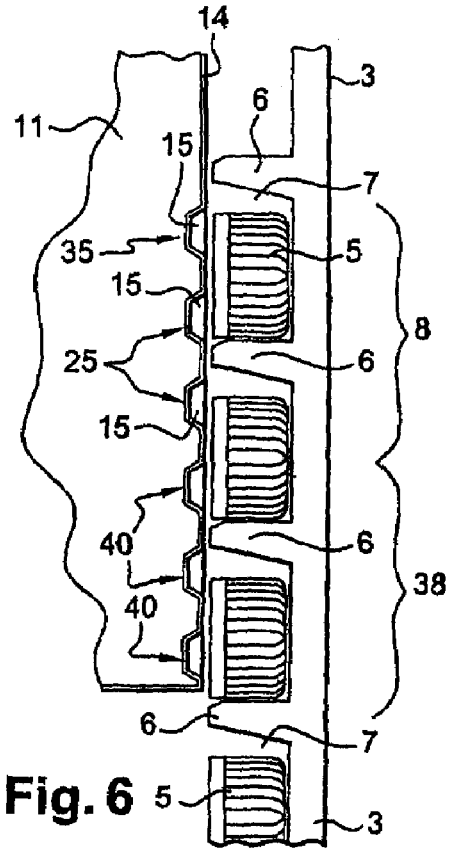
FIG. 6 shows a section along 6-6 of FIG. 5, said section being schematic and enlarged, showing the oriented caps located in the grooves of the finishing belt, said grooves being open to the ejection screen.

Part of the casing (11) masks the upper part of the belt (3); the remainder of said casing projects laterally downstream to support the routing conveyor (13). The wall of the casing (11) located on the belt (3) side comprises a plate (14) visible particularly in FIG. 2. Part of this plate (14) masks the belt (3), forming a sort of screen, for closing the grooves (7) of said belt (3), as shown in FIG. 6.

As shown in FIG. 2, the plate (14) comprises a multitude of orifices having the shape of eyes (15). These eyes (15), shown in greater detail in FIG. 3, are obtained by simple cutout and stamping of the plate (14), which is, for example, a metal plate. These eyes (15) form nozzles and shape small air jets with the air maintained under pressure in the casing (11). These pulsed air jets issuing from the eyes (15) are oriented downstream to laterally propel said caps from their grooves (7).

FIG. 2 shows the ejection and conveyor module adaptable to a finishing machine and particularly adaptable to the upper part of the belt (3). This module is fixed to the structure (2) of the machine, on either side of the belt (3), via a flange (19) located at the upstream end of the casing (11) and brackets (20) located in the downstream part of said casing (11).

This ejection module comprises the casing (11) with the turbine (9) and the routing conveyor (13), said casing (11) comprising, on the plate (14): —the ejection zone (8) extending between the flange (19) and the brackets (20) of said casing (11), and—an intermediate conveyor (22) extending from said brackets (20) to the end of the casing (11) and, particularly, to the inlet of said routing conveyor (13).

On this routing conveyor (13), an apron (24) prolongs the plate (14) with, similarly, eye shaped orifices (15) which propel the caps downstream, that is, toward a use station not shown.

The intermediate conveyor system (22) of the module shown in FIG. 2 appears in greater detail in FIG. 4, and it also appears in FIG. 5 with the ejection zone (8) described in detail below.

These various figures clearly show the continuity existing between the ejection zone (8) and the intermediate conveyor (22). This continuity is provided by the plate (14) and by the lines of eyes. There may be several lines of eyes (15); some extending over the entire plate (14), others on only part of said plate.

The continuity between the ejection and conveying of the caps results from the presence of at least one main line (25) comprising eyes (15). This main line (25) extends from the upstream part of the casing (11), next to the flange (19), to the end of the routing conveyor (13). Preferably, as shown in the various figures, there are two main ejection lines (25).

The spacing of these main lines (25) is related, as shown in FIG. 4, to the width of the conveyor system channel, that is, the channel (26) of the intermediate conveyor (22) and the channel (27) of the routing conveyor (13), said channels (26) and (27) forming a continuous channel whereof the width is substantially higher than the diameter of the caps (5).

Figure 7:
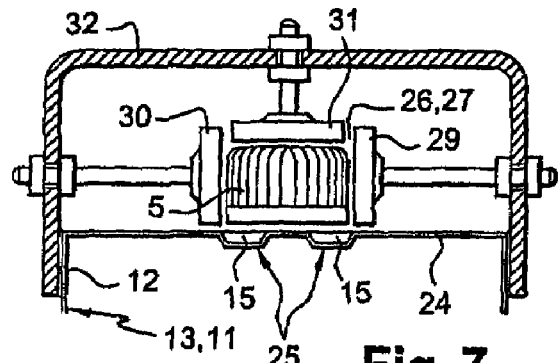
FIG. 7 shows a section along 7-7 of FIG. 4, showing, schematically and enlarged, an oriented cap located in the conveyor channel.

FIG. 7 shows the channel (27) in a cross section, serving to guide the properly oriented caps (5). This channel (27) of the routing conveyor (13) is identical to the channel (26) of the intermediate conveyor (22). These channels (26) and (27) cover the two main conveyor lines (25); they are open to allow the pulsed air issuing from the eyes (15) to escape and they comprise a pair of lateral guide rails (29) and (30) and an upper guide rail (31). These guide rails (29, 30 and 31) are supported by a straddle carrier shaped structure (32); these straddles (32) are connected to the chamber (12) of the routing conveyor (13) or of the casing (11) as applicable and are uniformly distributed over their length. The position of the various guide rails (29, 30 and 31) is adjustable with regard to the straddles (32), in order to adapt the dimensions of the channel to those of the caps (5) to be conveyed.

In FIGS. 2 and 4, only the lateral guide rails (29) and (30) are shown to avoid clutter. It may be observed that in these FIGS. 2 and 4 and in FIG. 5, the inlet of the intermediate conveyor (22) is V shaped. This inlet of the intermediate conveyor (22) is located opposite grooves (7) of the belt (3), to take charge of the caps (5) as they leave said grooves (7). The V opening on the belt (3) side is about 1.5 times the diameter of the caps (5).

The lower side of the V comprises the guide rail (29) extending to the belt (3) whereas the upper side comprises a guide (33) which prolongs the guide rail (30). This portion of guide (33) is supported by a straddle (32) which, as described previously, serves to adjust its position as required.

The upper guide rail (31) of the channel (26, 27) FIG. 7, is also prolonged to the belt (3) and is also located in the prolongation of the said belt to provide continuity in guiding the caps (5) as they leave their grooves (7).

Depending on the belt (3) speed, it may be necessary to provide additional lines of eyes.

Figure 5:
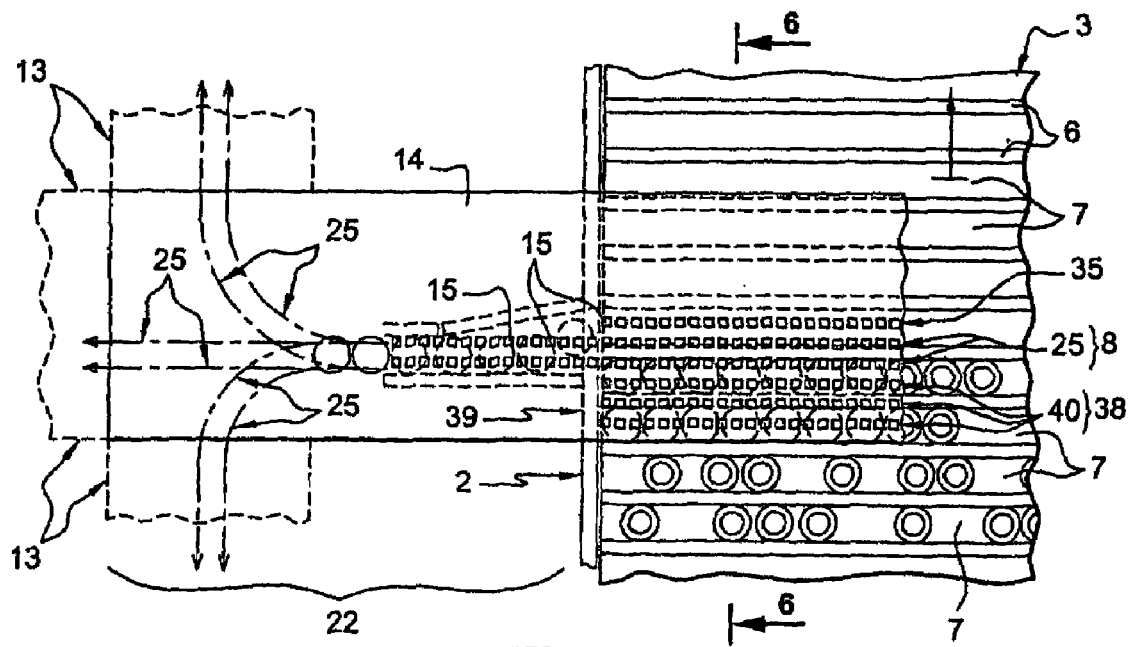
FIG. 5 shows, without the casing, the plate forming an ejection screen, viewed from the side of said casing, said plate being shown partially, as well as the belt of the finishing machine.

As shown in FIGS. 2, 4 and 5, the plate (14) comprises, in its part forming a screen on the belt (3), complementary lines of eyes. The ejection zone (8) comprises three lines of eyes: —the two main lines (25) already discussed and, —a complementary line (35) located above said main lines (25). This complementary line (35) continues the ejection of the caps (5) from their grooves (7), taking over from the first of the two main ejection lines (25) as the belt (3) advances. The length of this complementary line (35) corresponds to the width of the belt (3).

Before reaching the ejection zone (8), the caps (5) are disseminated over the width of the belt (3) in their groove (7). To prepare their ejection, these caps (5) are pre-thrust into the zone (38) of the plate (14) and of the belt (3) against a stop (39) formed by the downstream rim of the structure (2) of the machine. The caps (5) are pushed by pulsed air jets issuing from several lines of eyes located under the main lines (25). As shown in the various figures, three complementary lines (40) with eyes (15) concentrate the caps against the stop (39). The spacing between these various lines of eyes is the same as that of the two main lines (25).

FIG. 6 also shows the various lines of eyes (15) located opposite the caps (5). These caps are housed in the grooves (7) which are bounded by the belt (3) and its laths (6). The main lines (25) and the complementary lines (35) and (40) are formed in the plate (14) of the casing (11) and the eyes (15) of these lines enable the pulsed air to act on the caps (15) and to move them in their respective grooves.

FIG. 5 also shows an alternative embodiment of the intermediate conveyor (22). This intermediate conveyor (22) can form a different path on the plate (14) according to the orientation of the routing conveyor (13). The routing conveyor (13) may extend vertically above or below the casing (11); it may also extend between these two ends at a variable angle particularly at the horizontal as shown in FIG. 5.

The plate 14 of the casing (11) can be arranged, as required, with lines (25) equipped with eyes (15) which, regardless of the orientation of the routing conveyor (13), ensure a continuity between the latter and the ejection zone (8).

FIG. 8 shows an alternative of the ejection and conveyor module for the properly oriented caps. Instead of having the turbine (9) installed on the casing (11), this module comprises a laterally installed turbine (9), on the belt (3) side, under said casing (11), in the prolongation of the routing conveyor (13). This turbine (9) may also, instead of being hung from the casing (11), be placed on the floor, possibly connected to the base (1) of the machine.

The finishing machine equipped with its module can contend with all cases of installations thanks to the possibility of adjusting the height H of the routing conveyor 13. This possibility of adjusting the height H results from the design of the routing conveyor (13) which is divided into lengths (43); these lengths having unit heights of about 60 cm, for example, above a certain height.

The finishing machine becomes a sort of standard component; its belt has a length determined according to requirements for the sorting and orientation of the caps.

The invention claimed is:

1. A finishing machine comprising a hopper for receiving loose caps, and an endless belt having laths for extracting said caps from said hopper, wherein the caps are lodged in grooves bounded by said laths and said belt after extraction from said hopper, wherein said belt moves vertically with said caps to automatically sort said caps to retain only the caps having a proper orientation, wherein the machine further comprises a combined system for ejecting and conveying said oriented caps, said combined system comprising:

a plate which covers several adjacent grooves of said belt in which said oriented caps are located, said plate forming a screen on said belt and extending laterally, downstream beyond said belt, to direct said oriented caps as they are ejected from said grooves;

means for ejecting said oriented caps from their grooves and for subsequently conveying them downstream beyond said grooves, said ejection means comprising jets of propellant fluid which pass through said plate through eye shaped arrangements, said jets being oriented downstream, on said caps;

a casing constructed on said plate and into which said propellant fluid is introduced and maintained under pressure by suitable means to serve as a driving agent to eject and entrain said oriented caps, said casing extending over the entire surface of said plate and comprising, in its downstream part, means for accommodating and attaching a routing conveyor which prolongs said casing and routes said caps, with some continuity wherein the means which prolong the grooves and which directs the oriented caps, comprise an intermediate conveyor, said intermediate conveyor comprising a continuous channel divided into several parts: -a first part acting as an inlet, arranged in a V shape, located facing the downstream end of said grooves of said belt at the ejection zone, and subsequently, a second part forming a leader for the routing conveyor, said routing conveyor prolonging said intermediate conveyor and, with a propellant fluid, transporting said oriented caps.

2. The finishing machine as claimed in claim 1, further comprising a plate comprising several lines equipped with eyes wherein:

at least one main ejection and conveying line extends over the entire length of said plate;

at least one complementary ejection line is located above and/or below said at least one main ejection line, and extends over the entire width of the belt.

3. The finishing machine as claimed in claim 2, further comprising a plate comprising several lines equipped with eyes, wherein:

at least one main ejection and conveying line extends over the entire length of said plate;

at least one complementary ejection line is located above said at least one main ejection line, and extends over the entire width of the belt; and at least one complementary pre-thrust line is located under the at least one main ejection line and also extends over the entire width of said belt to gather the caps and force them against a stop located on the downstream side of said belt, under the inlet of the supporting V which receives said oriented caps after their ejection from the grooves of said belt.

4. The finishing machine as claimed in claim 1, further comprising one or more ejection lines which, in their downstream part, at the intermediate conveyor, form a path of which the curve is adapted to the orientation of the routing conveyor, said path possibly extending between the casing and the routing conveyor on either side of a horizontal, up to a vertical position.

5. The finishing machine as claimed in claim 1, wherein, the routing conveyor of the caps makes a right angle with the casing to which it is fitted, and further comprises a routing conveyor which constitutes a true functional element of said finishing machine, said routing conveyor being formed of an assembly of several lengths making it possible to change its height easily to adapt it to the requirements of the site and the place to which said caps must be delivered.

6. The finishing machine as claimed in claim 2, wherein a conveyor system of the oriented caps comprises a channel for the intermediate conveyor and a channel for the routing conveyor said channels, covering the main line(s) of eyes remaining open to allow the propellant fluid to escape and comprising—two lateral guide rails parallel to one another, placed on either side of said main lines of eyes, and—a guide rail extending opposite said main lines of eyes, between said lateral guide rails, said guide rails and optionally comprising means for adjusting their position to adapt the size of said channel to that of said caps to convey.

7. The finishing machine as claimed in claim 1, wherein the means for supplying pressurized propellant fluid to the casing and to the chamber of the routing conveyor comprises a turbine of which the capacity is adapted to the characteristics of the circuit, wherein the quantity of eyes to be supplied and the pressure to be maintained in said casing and said chamber, said pressure being about 1500 Pa.

8. The finishing machine as claimed in claim 7, further comprising a turbine placed directly on the casing, within the dimensions of the belt.

9. The finishing machine as claimed in claim 7, further comprising a turbine placed on the belt side under the casing.

10. A cap finishing machine for feeding at least one bottling line, comprising a system for ejecting and conveying oriented caps as claimed in claim 1, comprising a belt having a standard size and a cap ejection and conveying module which is fitted to said machine and of which the height H of the part constituting a routing conveyor is adjustable to freely adjust the level at which said caps must be delivered to the bottling station.

11. A finishing machine comprising a hopper for receiving loose caps, and an endless belt having laths for extracting said caps from said hopper, wherein the caps are lodged in grooves bounded by said laths and said belt after extraction from said hopper, wherein said belt moves vertically with said caps to automatically sort said caps to retain only the caps having a proper orientation, wherein the machine further comprises a combined system for ejecting and conveying said oriented caps, said combined system comprising:

a plate which covers several adjacent grooves of said belt in which said oriented caps are located, said plate forming a screen on said belt and extending laterally, downstream beyond said belt, to direct said oriented caps as they are ejected from said grooves;

a fluid system that ejects said oriented caps from their grooves and subsequently conveys them downstream beyond said grooves, said fluid system comprising jets of propellant fluid which pass through said plate through eye shaped arrangements, said jets being oriented downstream, on said caps;

a casing constructed on said plate and into which said propellant fluid is introduced and maintained under pressure by nozzles to serve as a driving agent to eject and entrain said oriented caps, said casing extending over the entire surface of said plate and comprising, in its downstream part, a system for accommodating and attaching a routing conveyor which prolongs said casing and routes said caps, with some continuity wherein the system which prolong the grooves and which directs the oriented caps, comprise an intermediate conveyor, said intermediate conveyor comprising a continuous channel divided into several parts: —a first part acting as an inlet, arranged in a V shape, located facing the downstream end of said grooves of said belt at the ejection zone, and subsequently, a second part forming a leader for the routing conveyor, said routing conveyor prolonging said intermediate conveyor and, with a propellant fluid, transporting said oriented caps.

* * * * *